(12) United States Patent
Lu et al.

(10) Patent No.: US 9,237,531 B2
(45) Date of Patent: Jan. 12, 2016

(54) REAL-TIME EXPOSURE ASSESSMENT

(71) Applicant: QUALCOMM Incorporated, San Diego, CA (US)

(72) Inventors: Lin Lu, San Diego, CA (US); Jagadish Nadakuduti, La Jolla, CA (US); Paul Guckian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 13/801,232

(22) Filed: Mar. 13, 2013

(65) Prior Publication Data

US 2014/0274190 A1    Sep. 18, 2014

(51) Int. Cl.
*H04B 7/00* (2006.01)
*H04W 52/36* (2009.01)

(52) U.S. Cl.
CPC .................................. *H04W 52/367* (2013.01)

(58) Field of Classification Search
USPC ............ 455/127.1–127.4, 522, 68, 69, 422.1, 455/423, 424, 500, 523, 550.1
See application file for complete search history.

(56) References Cited

U.S. PATENT DOCUMENTS

| | | | |
|---|---|---|---|
| 7,583,089 B2 * | 9/2009 | Onishi et al. | 324/632 |
| 8,538,351 B2 * | 9/2013 | Wilson et al. | 455/127.1 |
| 2012/0021800 A1 * | 1/2012 | Wilson et al. | 455/550.1 |
| 2013/0122827 A1 * | 5/2013 | Ali et al. | 455/77 |
| 2013/0252658 A1 * | 9/2013 | Wilson et al. | 455/522 |
| 2014/0248892 A1 * | 9/2014 | Wilson et al. | 455/452.1 |

OTHER PUBLICATIONS

Kanda, et al., "Faster Determination of Mass-Averaged SAR from 2-D Area Scans," IEEE Transactions on Microwave Theory and Techniques, vol. 52, No. 8, Aug. 2004, pp. 2013-2020.

* cited by examiner

*Primary Examiner* — Fayyaz Alam
(74) *Attorney, Agent, or Firm* — Fountainhead Law Group P.C.

(57) ABSTRACT

Efficient techniques for determining compliance of a wireless device with radio-frequency (RF) exposure standards and regulations. In an aspect, two-dimensional surface scans of a device are determined and stored in a memory during a certification phase. Each scan corresponds to a basis surface scan wherein only one transmitter and one antenna of the device are active. During real-time operation, the basis surface scans corresponding to the real-time active transmitters and antennas of the device are retrieved. The retrieved scans are processed according to the real-time operating parameters to determine an estimated RF exposure metric, e.g., a peak specific absorption rate (SAR). The transmit power levels of the device may be adjusted in real time to ensure compliance of the estimated RF exposure metric with applicable standards and regulations.

20 Claims, 9 Drawing Sheets

- M bands
- Combinations of N transmitters and/or A antennas
- C channels
- T technologies
- P positions

REAL-TIME EXPOSURE ASSESSMENT

BACKGROUND

1. Field

The invention relates to efficient techniques for exposure assessment of wireless devices.

2. Background

Modern wireless devices such as cellular phones are generally required to meet radio frequency (RF) exposure requirements as mandated by domestic and international standards and regulations. To ensure compliance with the standards, such devices must currently undergo an extensive certification process prior to being shipped to market. The certification process may entail performing a large number (e.g., thousands) of measurements on each device to determine the exposure caused by the device under different operating scenarios. For example, to determine a parameter known as specific absorption rate (SAR), a field scan may be performed over a two-dimensional (2D) surface surrounding the device, and subsequently a three-dimensional (3D) volume scan may be performed at specific points identified on the surface scan that correspond to high SAR.

State-of-the-art wireless devices increasingly support multiple communication technologies (e.g., W-CDMA, LTE, etc.) and/or multiple transmission bands in a single terminal. An exhaustive sweep over all possible operating scenarios to ensure RF exposure compliance would be time-consuming, as 2D and 3D field measurements would need to be performed for each possible combination of active transmitter(s) (TX), active antenna(s), frequency bands, channels, technologies, etc. The excessive time and cost of such measurements would render existing certification processes impractical.

It would be desirable to provide techniques for efficiently assessing compliance of wireless devices with RF exposure requirements to reduce the time and cost of certification.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The detailed description set forth below in connection with the appended drawings is intended as a description of exemplary aspects of the invention and is not intended to represent the only exemplary aspects in which the invention can be practiced. The term "exemplary" used throughout this description means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein. In this specification and in the claims, the terms "module" and "block" may be used interchangeably to denote an entity configured to perform the operations described.

Figure 1:
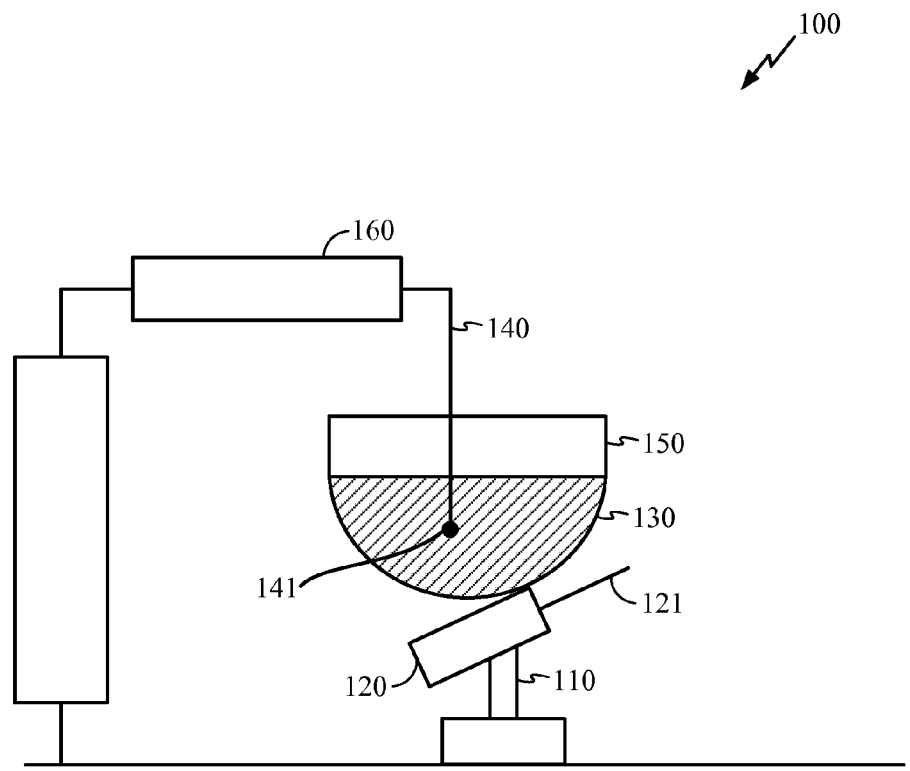
FIG. 1 illustrates a prior art implementation of a test set-up for assessing SAR compliance of a given wireless device.

To assess the RF exposure compliance of wireless devices with international standards and regulations, it is necessary to determine the SAR for the wireless devices under specific sets of device operating scenarios. In the prior art, such testing of wireless devices may be performed in a test laboratory, prior to shipment of the wireless device as a consumer product, e.g., as part of a certification process. FIG. 1 illustrates a prior art implementation of a test set-up 100 for assessing SAR compliance of a given wireless device. Note FIG. 1 is shown for illustrative purposes only, and is not meant to limit the scope of the present disclosure in any manner.

In FIG. 1, a wireless device 120 having an antenna 121 is supported by a support fixture 110. Note the antenna 121 is shown for illustrative purposes only, and is not meant to limit the scope of the present disclosure to any particular antenna configuration. For example, in certain alternative implementations, a wireless device may include one or more antennas integrated internally within the body of the device. A body phantom 150 containing a phantom (or tissue-simulating) liquid 130 having dielectric properties simulating a body part of interest (e.g., a human head) is provided adjacent to the wireless device 120. A robotic arm 160 further supports a field probe 140, whose terminal end contains field sensors 141 measuring RF emissions, e.g., electric field (E-field or E), magnetic field (H-field or H), and/or specific absorption rate, at a given locale around the field sensors 141. By moving the robotic arm 160 over a spatial range of interest, the field probe 140 may measure the RF emissions of the wireless device 120 over such range.

Figure 2:
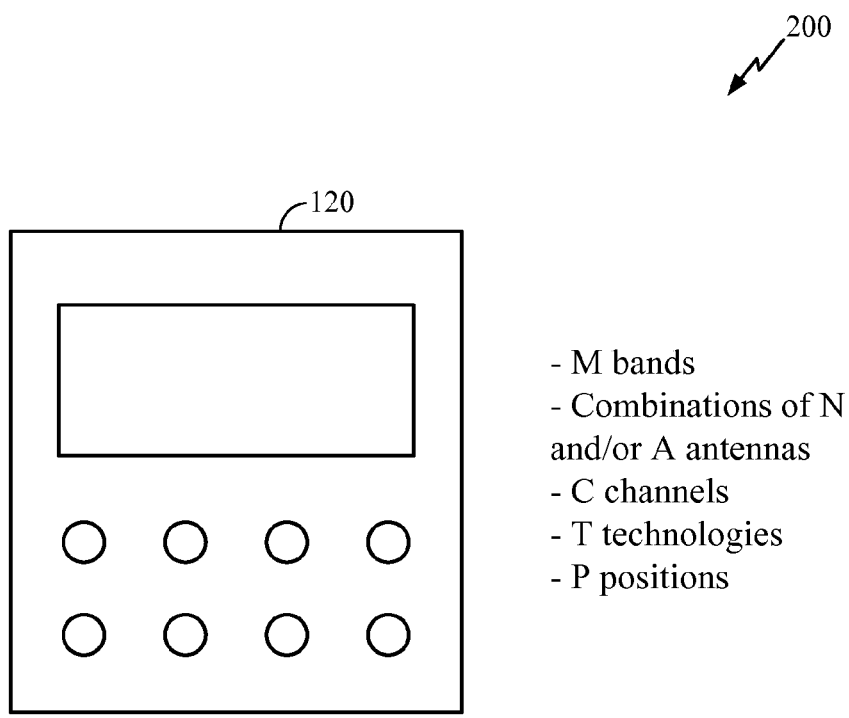
FIG. 2 illustrates a representation of the necessary iterations for testing a wireless device according to state-of-the-art certification processes.

In a typical certification process, it may be required to perform a large number of measurements using the test set-up 100, e.g., on a prototype device, prior to mass production and shipment of the product to market. For example, a state-of-the-art testing process may require exhaustive SAR measurements to be performed and evaluated for each possible operating scenario of a wireless device, e.g., across different combinations of M modes and/or bands, possible combinations of N transmitters, A antennas, C channels, T technologies, and P device positions relative to the body phantom 150, as shown by illustration 200 of FIG. 2. Note in this specification, the variables M, N, A, C, T, and P may each correspond to the total number quantity of the corresponding item. Furthermore, as further described in detail hereinbelow, the number of possible operating parameter combinations for each device increases according to the number of transmitters, antennas, and/or operating bands for each device.

Figure 3:
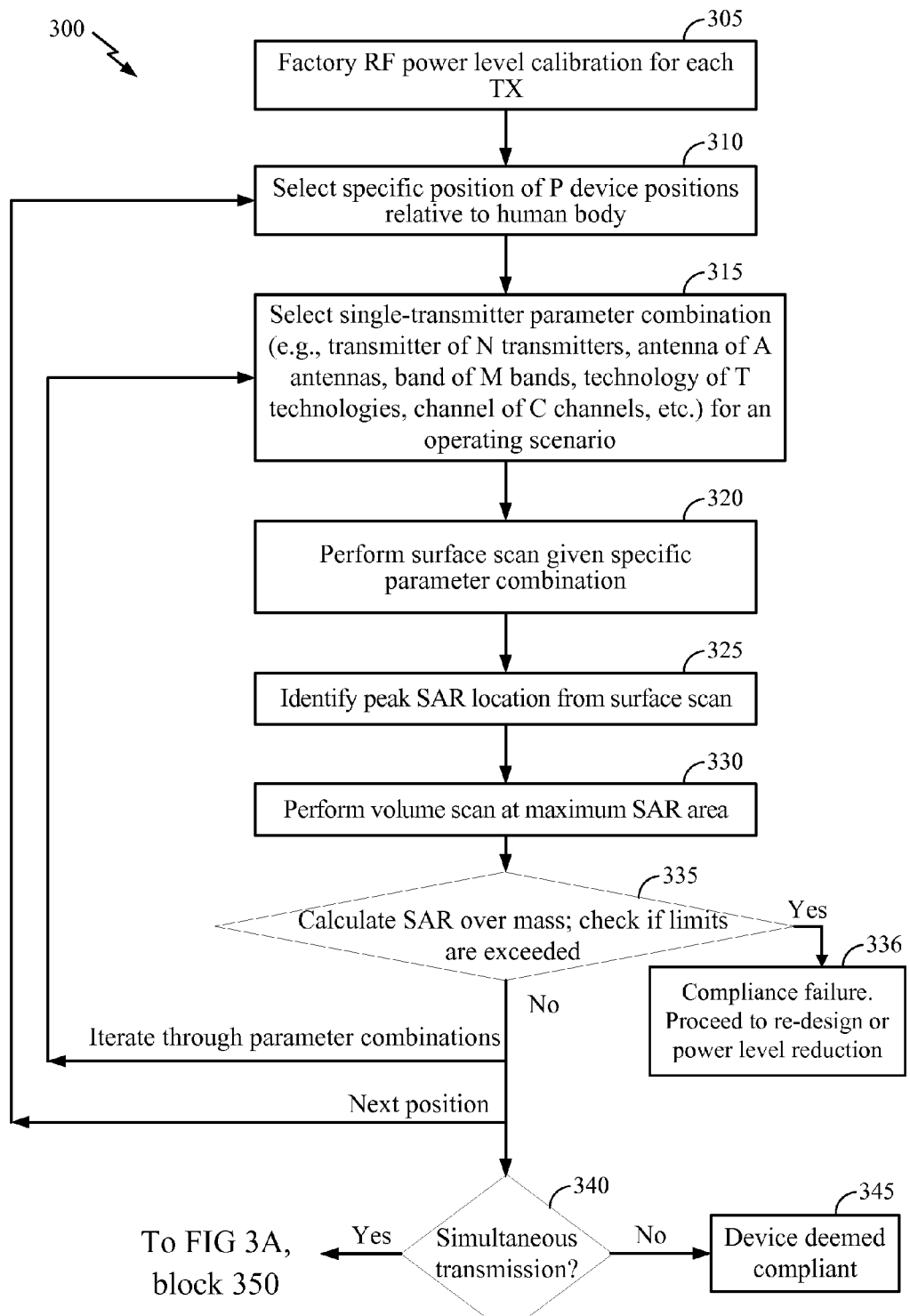
FIGS. 3 and 3A illustrate an example of a prior art method for testing a wireless device for SAR compliance, which also includes the requirement of performing SAR assessment for simultaneous transmission across all possible combinations of transmitters and antennas.

FIG. 3 illustrates an example of a prior art method 300 for testing a wireless device 120 for SAR compliance, including assessing SAR for simultaneous transmission across all supported combinations of transmitters and antennas. Note FIG. 3 is shown for illustrative purposes only, and is not meant to limit the application of the techniques of the present disclosure to any particular system shown.

In FIG. 3, at block 305, factory RF calibration is performed to determine the nominal maximum transmit power levels of the wireless device prior to certification testing. For example, during RF calibration, each transmitter of the wireless device may be set to transmit at its maximum level, and the actual power level corresponding to such maximum transmission may be measured and recorded.

At block 310, a specific position (e.g., right vs. left, cheek vs. tilt, head vs. body) for testing is selected from a total number P of possible device positions relative to a human body. As illustrated in FIG. 1 for the illustrative test set-up 100, the designation of a specific body position may specify the position, e.g., orientation and relative position, of the mobile device 120 relative to the probe 140.

At block 315, a single-transmitter parameter combination for a specific operating scenario is selected and enabled for the wireless device. Note in this specification and in the claims, unless otherwise noted, the term "combination" may denote a "parameter combination," i.e., specifying a particular combination of parameters corresponding to an operating scenario of the wireless device. In particular, the single-transmitter parameter combination may specify a single active transmitter (out of N possible transmitters), an active antenna (out of A possible antennas), a specific band (out of M supported bands), a specific technology (e.g., WCDMA, LTE, etc.) selected from a total number T of technologies, etc. It will be appreciated that the number of bands, active transmitters, etc., may all be different depending on each technology.

The parameter combination may also specify a specific channel, e.g., frequency channel within a band, selected from a total number C of channels in each band. The total number C may also include low-, mid-, and high-channels within the selected band. Note in some systems, the definition of a "channel," as well as the value of C, may be different depending on technology. For example, in an LTE system, C may include not only the number of channels in each band, but also the number of resource block (RB) configurations that need to be evaluated.

Note the specific parameters (e.g., transmitters, antennas, bands, technologies, channels, etc.) enumerated herein with reference to FIGS. 3, 3A, 4, 5, and 5A are given for illustrative purposes only, and are not meant to limit the scope of the present disclosure to any parameter combinations necessarily including all or any of the parameters listed. For example, in certain alternative implementations, parameter combinations may omit one or more of the parameters mentioned, or may specify other parameters in addition to those specifically enumerated. Such alternative types of parameter combinations are contemplated to be within the scope of the present disclosure.

At block 320, a surface SAR scan (e.g., two-dimensional or "2D" point-SAR scan) is performed, given the selected parameter combination set at blocks 310 and 315. In an implementation, the surface SAR scan may be performed by sweeping the probe 140 over a predetermined two-dimensional (2D) surface, and measuring the SAR corresponding to points on the 2D surface according to a pre-specified spatial resolution. The 2D surface may be defined according to any convention known in the art, e.g., a surface may be defined having constant or variable distances from a point or points on the wireless device 120.

At block 325, one or more peak SAR locations may be identified from the 2D surface scan performed at block 320.

At block 330, a volume (three-dimensional or 3D) SAR scan is performed surrounding the identified peak location(s). A volume scan provides more detail of the local SAR surrounding the peak location(s) than is available from the 2D surface scan performed at block 320. Compared to the surface scan, it may be relatively more time-intensive to perform the volume scan.

At block 335, based on the volume scan(s), the SAR value over a mass, e.g., 1 g or 10 g, is calculated. Furthermore, it is checked whether the calculated SAR exceeds the prescribed limits. If the limits are not exceeded, then the method 300 proceeds to further iteration as further described hereinbelow. If the limits are exceeded, then compliance failure may be declared at block 336. Note in response to declaring compliance failure, the method 300 may call for re-design of the wireless device to ensure SAR compliance. Alternatively, the maximum power level of the selected transmitter may be reduced to a lower level and/or recorded in a memory, and the SAR may be re-evaluated at the reduced maximum transmitted power level, e.g., at blocks 320 through 335.

Following block 335, if SAR limits are not exceeded, then the method 300 may return to block 315 to iterate through the remaining combinations not tested, e.g., proceeding to the next combination of transmitter, band, technology, channel, etc. The method 300 may further return to block 310 to iterate through positions not tested.

Following iterations through all combinations and positions, it is assumed that the check at block 335 has passed for iterations over all combinations, and the device is deemed to be in compliance with SAR requirements at the maximum operating transmitting powers of all transmitters tested individually. In particular, as only individual transmitters are selected for each combination at block 315, only measurements corresponding to individual active transmitters are performed for iterations through blocks 310-335 described hereinabove. Following determination of compliance for transmitters individually, it is then determined whether compliance is also met if/when multiple transmitters are simultaneously active.

Accordingly, at block 340, it is checked whether simultaneous transmission, e.g., by multiple transmitters, is called for by the design of the wireless device, e.g., based on device capability. If no, then the method proceeds to block 345, wherein the device is deemed compliant. If yes, i.e., simultaneous transmission by multiple active transmitters is called for by the device, then the method proceeds to block 350 of FIG. 3A, showing the continuation of the method 300.

Figure 3A:
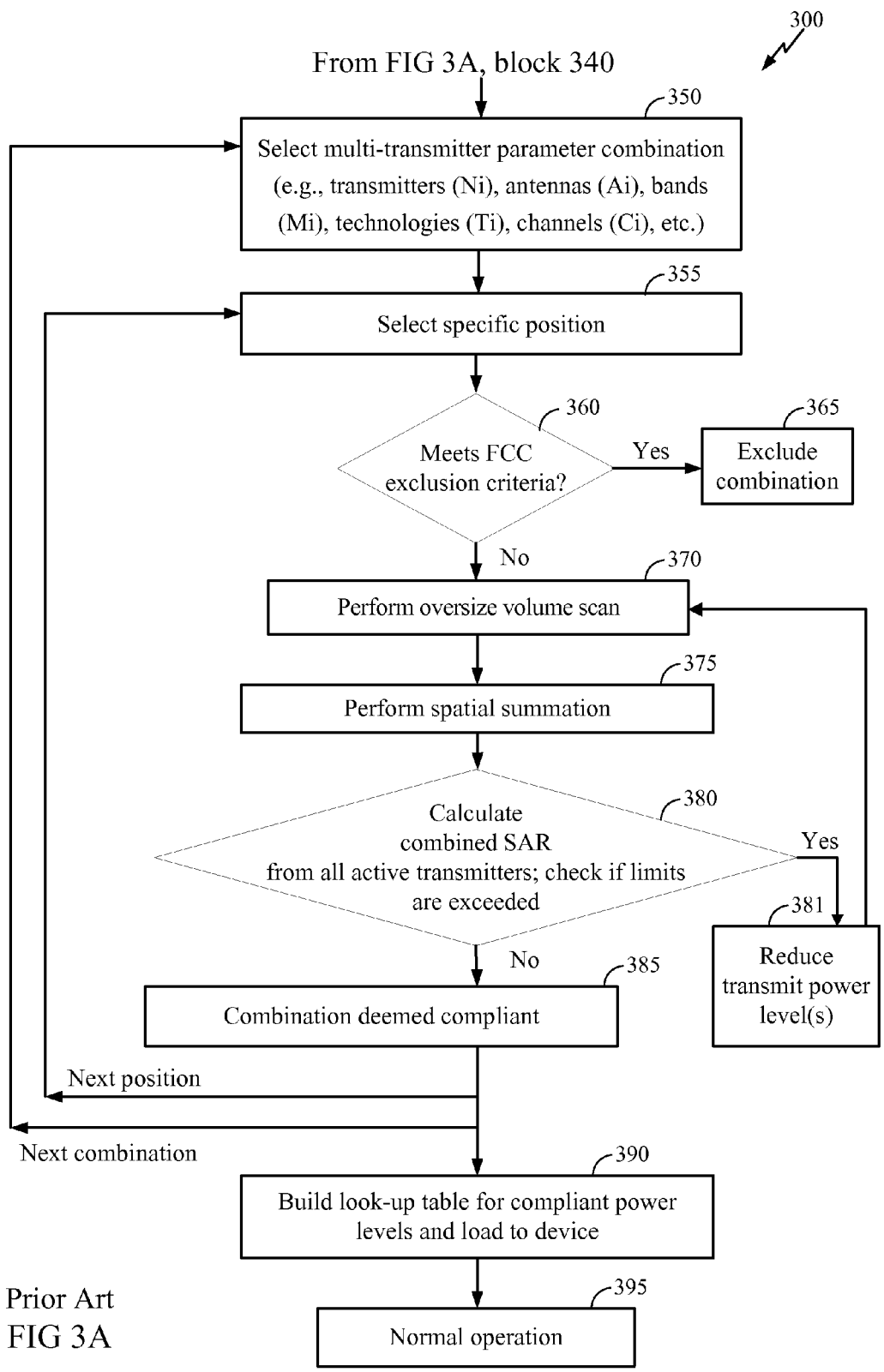

In FIG. 3A, at block 350, a specific multi-transmitter parameter combination for the wireless device is specified. The multi-transmitter parameter combination may specify parameters for an operating scenario wherein multiple devices are simultaneously active, e.g., which Ni transmitters of N total transmitters are simultaneously active, which Ai antennas of A total antennas are active, which Mi bands of M total bands are being transmitted, which Ti technologies of T total technologies are utilized, which Ci channels of C total channels are selected, etc. Note per the description hereinabove that Ni≤N, Ai≤A, Mi≤M, Ti≤T, and Ci≤C. Further note that, e.g., there may be multiple possible combinations of Ni transmitters for a device accommodating N total transmitters, i.e., there is generally a plurality ($^N_{Ni}$) or "N choose Ni" possible ways to choose Ni transmitters out of N total transmitters. As a plurality Ni of transmitters are simultaneously active according to the selection at block 350, the other parameters shown may also (but need not) be larger than 1. For example, if Ni=2, i.e., two transmitters out of N are simultaneously active, then each transmitter may transmit on a different band (i.e., Mi=2); alternatively, both transmitters may transmit on a single band (i.e., Mi=1). The same applies to the other parameters shown in block 350, e.g., technologies, channels, etc.

As a specific example, consider the case wherein N=4, M=4, T=4, and C=12. For this illustrative implementation, setting the specific combination of parameters at block 350 may include setting Ni=2, Mi=2, Ti=2, Ci=2. As an exemplary instance of these settings, transmitter #1 (of 4 total transmitters) may be active, with transmitter #1 transmitting at a first channel (of 12 channels) of a first band (of 4 total bands) using LTE technology. Furthermore, transmitter #2 may be active, with transmitter #2 transmitting at a second channel of a second band using W-CDMA technology. It will be appreciated that the preceding combination is provided for illustrative purposes only, and is not meant to limit the scope of the present disclosure. In general, note that any transmitter may transmit using a parameter, e.g., technology, independently of the corresponding parameter used by any other transmitter, depending on the operating technology combinations supported by the wireless device.

At block 355, for the combination selected at block 350, a specific position (e.g., right vs. left, cheek vs. tilt, head vs. body) is further selected from a total number P of possible device positions relative to a human body.

Note for the specific combination of input parameters as selected at blocks 350 and 355, the power levels of the active transmitters are set to their maximum levels, so that the maximum exposure caused by the device according to such combination of parameters may be determined according to the subsequent measurement blocks.

At block 360, it is checked whether the specific combination of transmitter(s)-band(s)-technologies-channel(s)-position meets FCC exclusion criteria. In particular, such criteria specify certain combinations for which compliance determination is not necessary. For example, the FCC exclusion criteria for the 1 g-SAR metric for a two-active-transmitter combination is that a predetermined factor (e.g., as determined by the sum of the stand-alone 1 g-SAR for each pair of antenna/distance in centimeters between peak SAR locations of two transmitters) is less than 0.3. Additionally, for combinations with 2 or more active transmitters, if the summation of peak SAR's determined for individual transmitters in block 335 is less than 1.6, the FCC exclusion criteria stipulates that such combinations can also be excluded from further investigation. If the given combination meets the FCC exclusion criteria, then the specific combination need not be investigated, per block 365. If the given combination does not meet the FCC exclusion criteria, then the method proceeds to block 370.

At block 370, oversize volume SAR scans are performed. An "oversize" volume scan may refer to a scan performed over a volume that is sufficiently large so as to cover all regions that may correspond to high SAR (also denoted herein as "hotspots") in the vicinity of the wireless device. For example, for a device with multiple antennas, there may be multiple such hotspots, and thus the oversize volume will need to be sufficiently large so as to enclose all such hotspots. In a typical implementation, the oversize volume SAR scan may be performed by turning on each transmitter selected in block 350 one transmitter at a time. However, an exception may be made for those instances wherein two or more active transmitters are operating at the same frequency. In these cases, the oversize volume SAR scan may be performed by simultaneously turning on such two or more transmitters, as the field generated by such transmitters simultaneously active on the same frequency should be added coherently.

At block 375, spatial summation over all oversize volume scans for all active transmitters is performed to determine the aggregate volume SAR data.

At block 380, based on aggregate volume scan data derived at block 375, aggregate SAR over a mass, e.g., 1 g or 10 g, is calculated, corresponding to the aggregate SAR for the specific parameter combination selected at blocks 350 and 355. Furthermore, at block 380, it is checked whether the calculated aggregate SAR exceeds the prescribed limits, e.g., as defined according to the applicable standards or regulations. If the limits are exceeded, then the method 300 proceeds to block 381. If the limits are not exceeded at block 380, then the method 300 proceeds to block 385.

At block 381, the power level(s) of the transmitters may be reduced and recorded, and the method 300 may return to block 370 to perform the SAR determination at the reduced power level.

At block 385, the parameter combination is deemed compliant, and the method 300 proceeds to investigate further combinations, e.g., by iterating through the remaining positions and combinations of interest. Tx power levels may be recorded at block 385.

After iterating through all remaining combinations, the method 300 proceeds to block 390. At block 390, a look-up table may be established using the recorded (possibly reduced) power levels that were found to cause the wireless device to be compliant over the different operating scenarios. In an implementation, the look-up table may be loaded into a memory of the wireless device, and the look-up table may be relied upon to determine the allowable in-field transmit power levels for the wireless device to ensure SAR compliance. In certain implementations, the measurements indicated in FIGS. 3 and 3A may be performed on a prototype device, while the look-up table obtained therefrom may be loaded into the memory of devices that are subsequently mass-produced.

At block 395, the compliant device may be shipped to market, where it may be used by an operator of the device, e.g., in "real time."

From the description hereinabove, it will be appreciated that the total number of measurements (e.g., volume scans performed at block 370) required during certification may be exceedingly large, given the multiple possible band/transmitter combinations to be iterated through. For example, assuming M bands and N transmitters, the total number of possible combinations of bands and transmitter(s) may be computed as (Equation 1):

Number of combinations of bands and transmitters=$\Sigma_{k=1}^{N}(^N_k)M^k$;

wherein $\binom{N}{k}$ or "N choose k" expresses the number of different subsets of size k that may be chosen from a set of N elements. For example, for a 10-band, 4-transmitter device (i.e., M=10, N=4), the Number of combinations computed per Equation 1 is equal to 14,640. Furthermore, given 3 channels, 3 technologies, and 5 positions (i.e., C=3, T=3, P=5), the total number of SAR assessments (i.e., surface scan followed by volume scan, with each such scan also including a plurality of point measurements) would be 658,800. From these estimates, it will be appreciated that the prior art testing method 300 may require an excessive amount of time to test a wireless device having the typical parameters described.

Techniques of the present disclosure advantageously decrease the number of required SAR measurements required in the certification process, while nevertheless allowing reliable determination of whether the wireless device complies with RF exposure standards. According to the present disclosure, rather than performing surface then volume scans across all possible combinations of bands and transmitters, scans need only be performed across a subset of all possible parameter combinations. In particular, a surface scan is performed for each band, but with only one transmitter and one antenna activated at a time. Following the surface scan(s), no volume scan is performed. For example, in an exemplary embodiment, for the 10-band, 4-transmitter device earlier described hereinabove, only 10 surface scans (i.e., for each band) need be performed for each of the four transmitters, resulting in 40 total surface scans.

The results of the surface scans may subsequently be stored in a memory of the wireless device. During real-time operation of the wireless device, an algorithm implemented by a processor of the wireless device uses the stored surface scans, along with knowledge of the real-time exposure or operating scenario (e.g., knowledge of the real-time active transmitter(s), antenna(s), band, technology, position, etc.), to determine the appropriate power levels for individual transmitters to meet regulatory requirements, e.g., for aggregate SAR over a 1 g/10 g mass. Further details of exemplary embodiments according to the present disclosure are described hereinbelow.

Figure 4:
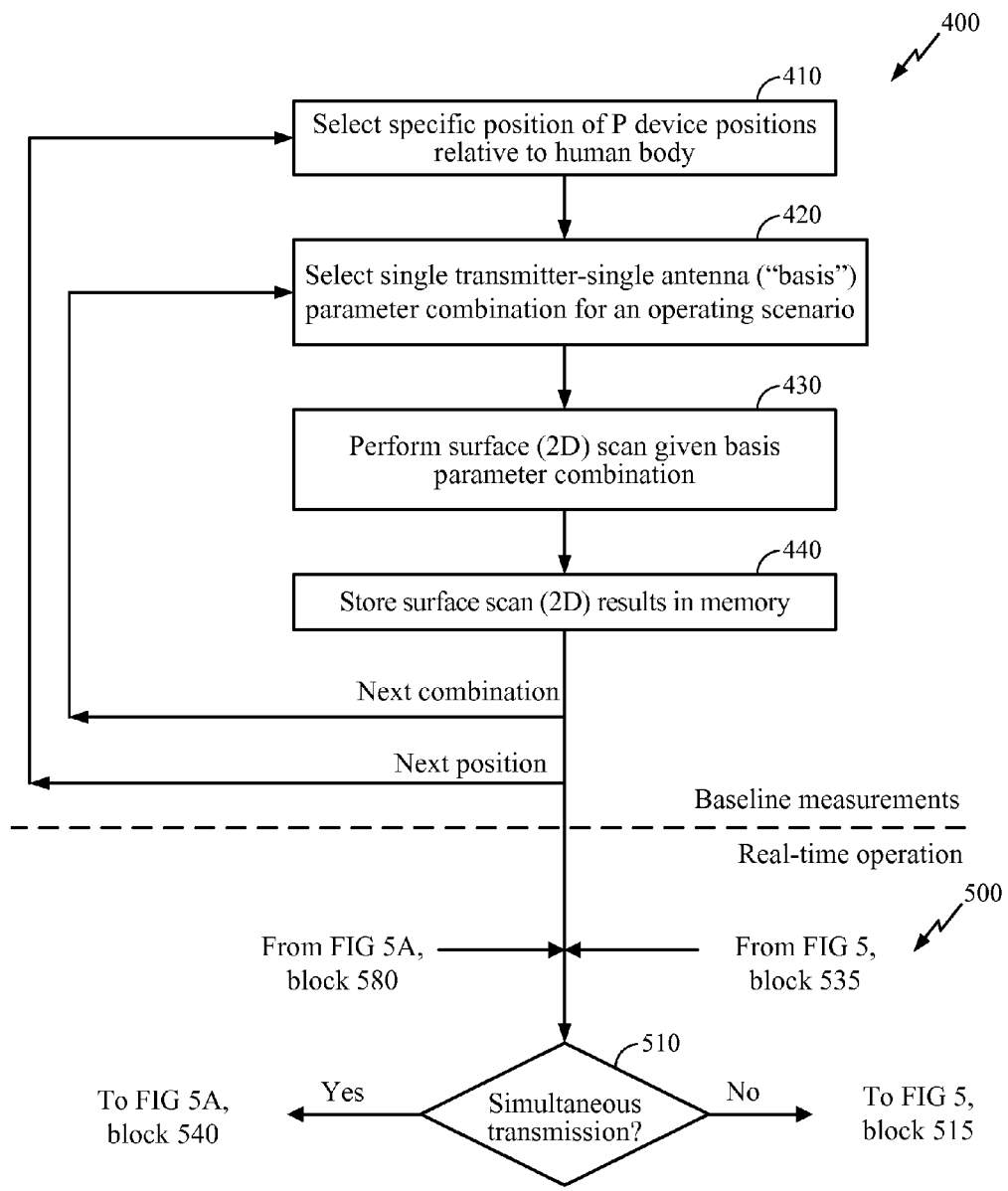
FIG. 4 illustrates an exemplary embodiment of a method according to the present disclosure.

FIG. 4 illustrates an exemplary embodiment 400 of a method according to the present disclosure. Note the method 400 is shown for illustrative purposes only, and is not meant to limit the scope of the present disclosure. It will further be appreciated that, unless otherwise explicitly noted, alternative exemplary embodiments of the present disclosure need not follow the exact sequence of iterations shown in FIG. 4, e.g., block 420 may precede block 410, etc. Such alternative exemplary embodiments are contemplated to be within the scope of the present disclosure.

In FIG. 4, at block 410, a specific position (e.g., right vs. left, cheek vs. tilt, head vs. body) is selected from a total number P of possible device positions relative to a human body.

At block 420, a single transmitter-single antenna parameter combination for a specific operating scenario is selected and enabled for the wireless device. A parameter combination specifying only one active transmitter and one active antenna is also denoted herein as a "basis parameter combination." In particular, a basis parameter combination may specify a single active transmitter (out of N possible transmitters) and a single active antenna (out of A possible antennas), along with other parameters defining the combination, e.g., a specific band (out of M supported bands), a specific technology (e.g., WCDMA, LTE, etc.) selected from a total number T of technologies, etc. The basis parameter combination may also specify a specific channel, e.g., frequency channel within a band, selected from a total number C of channels in each band. Note the basis parameter combination may also specify the position to be tested as a parameter.

At block 430, a surface (e.g., two-dimensional or "2D") scan is performed, given the basis parameter combination selected at block 420. In an exemplary embodiment, either an SAR scan or an E-field scan (or "E-scan") may be performed at block 430. In an exemplary embodiment, field probes 140 that can measure both magnitude and phase of electric field are provided to obtain magnitude and phase information of the three orthogonal components (e.g., x-, y-, and z-components) of the E-field.

Note if multiple simultaneously active transmitters operating at the same frequency are supported by the wireless device, then an E-scan may be performed for each single transmitter-single antenna combination that is involved in the simultaneous transmission so that the effects of coherent summation of the E-fields generated by the multiple transmitters during real-time operation can be captured. Otherwise, if the multiple simultaneously active transmitters operate at different frequencies, then either an E-scan or an SAR scan may be performed at block 430.

The surface scan obtained at block 430 is also denoted herein as a "basis surface scan," in view of the fact that only one transmitter and one antenna are activated. As further described hereinbelow, the basis surface scans may subsequently be extrapolated to 3D, and the results may be aggregated to determine composite SAR's for multiple simultaneously active transmitters and/or antennas, e.g., during real-time operation of the device using a predetermined algorithm.

In an exemplary embodiment, the surface scan may encompass a surface that encloses regions of high SAR corresponding to all active antennas. In an exemplary embodiment, all the basis surface scans performed at block 430 are intended to cover a region that may be coextensive with the physical footprint of the entire wireless device 120 and its antennas 121, so that the SAR or E peaks from all basis parameter combinations are captured. Furthermore, the spatial resolution of the surface scan may be adjusted based on the transmitting frequency. In particular, the resolution of the basis surface scans may be varied depending on the operating frequency of the basis parameter combination, with increased resolution generally desirable for higher frequencies.

At block 440, the basis surface scan results are stored in a memory. In an exemplary embodiment, the memory may be provided on the wireless device being tested. The surface scan results measured using probe 140 can be stored in the memory in terms of either electric field or point SAR.

Following block 440, the method 400 iterates through the remaining combinations not tested, e.g., proceeding through different combinations of technology, channel, band, transmitter, antenna, position, etc.

It will be appreciated that blocks 410, 420, 430, 440 may correspond to operations performed prior to real-time operation of the device, e.g., during a laboratory measurement phase. Blocks 410-440 are also denoted herein as corresponding to "baseline measurements," as indicated in FIG. 4.

As further described hereinbelow with reference to the method 500, including blocks 510-580, the basis surface scan results stored in memory may subsequently be used by a processor to compute expected SAR values in real time. In particular, the computations may be performed for real-time operating scenarios wherein a single transmitter is active, as well as for scenarios wherein possibly multiple transmitters and/or antennas are simultaneously active. For multiple simultaneously active transmitters and/or antennas, the processor may perform computations using a pre-determined algorithm such as described with reference to blocks 555-560 hereinbelow for appropriately extrapolating and aggregating the basis surface scan results to compute mass-averaged SAR in real time.

In particular, following the baseline measurements indicated in FIG. 4, the method 400 may proceed to real-time operation of the wireless device. In general, during real-time operation, an algorithm embedded in a processor of the wireless device may calculate the real-time aggregate peak spatial-average SAR based on the stored basis surface scans in the memory of the device. The embedded algorithm takes into account the specific real-time operating scenario parameter combination, e.g., the band, transmitter, antenna, channel, technology, position, etc., corresponding to the real-time operating scenario.

In an exemplary embodiment, the embedded algorithm may load the basis surface scans from memory for currently active transmitters and antennas according to the real-time parameter combination. In particular, it will be appreciated that an arbitrary real-time parameter combination may generally be decomposed into a collection of one or more basis parameter combinations. For example, a real-time parameter combination specifying an active transmitter #1, whose output signal is coupled to active antenna #1, and an active transmitter #2, whose output signal is coupled to active antenna #2, may be decomposed into two basis parameter combinations, i.e., a first basis parameter combination corresponding to active transmitter #1 and active antenna #1, and a second basis parameter combination corresponding to active transmitter #2 and active antenna #2. Alternatively, a real-time parameter combination specifying an active transmitter #1, whose output signal is coupled to both active antenna #1 and active antenna #2, may also be decomposed into two basis parameter combinations, i.e., a first basis parameter combination corresponding to active transmitter #1 and active antenna #1, and a second basis parameter combination corresponding to active transmitter #1 and active antenna #2. It will be appreciated that one of ordinary skill in the art may readily derive the basis parameter decomposition for an arbitrary real-time parameter combination in view of the description hereinabove.

Upon retrieving the basis surface scan(s) stored in memory corresponding to the basis parameter combination(s) so determined, the embedded algorithm may extrapolate the 2D point SAR (or E-field) of each basis surface scan over a 3D volume, to estimate the mass-averaged SAR (e.g., 1 g or 10 g mass) distribution in the volume projected by each basis (or "sub-group" as further described hereinbelow) surface scan into the body phantom 150. The operations of 2D-to-3D extrapolation and estimating the mass-averaged SAR may be performed according to techniques known in the art, e.g., as disclosed in Kanda et al., "Faster determination of mass-averaged SAR from 2-D area scans," IEEE Trans. Microwave Theory Techniques, 52(8):2013-2020, 2004. For example, as per Kanda, the single-transmitter-single-antenna mass-averaged SAR (e.g., 1 g or 10 g mass) may be estimated from a basis surface scan using knowledge of the transmit frequency of the basis parameter combination.

In an exemplary embodiment, if two or more basis parameter combinations specify transmission at the same frequency, then such basis parameter combinations may be initially grouped into a "sub-group." Vector and spatial summation may be performed on the magnitude and phase information of electric fields stored in the basis surface scans of the same sub-group, to account for the coherent addition of electric field from transmitters at the same frequency. Point SAR determined from such coherently summed electric fields for basis surface scans specifying the same transmit frequency may subsequently be referred to as a representative "sub-group surface scan."

Following determination of the extrapolated basis or sub-group mass-averaged SAR distribution in the volume projected by the corresponding surface scan into the body phantom 150, the mass-averaged volume SAR data may be spatially summed across all 3D-extrapolated basis and/or all 3-D extrapolated sub-group SAR to determine aggregate mass-averaged SAR, accounting for the total contributions to SAR from all basis parameter combinations corresponding to the real-time parameter combination. The peak mass-averaged SAR is then determined from the aggregate mass-averaged volume SAR.

In an exemplary embodiment, the real-time determination of aggregate SAR (e.g., peak mass-averaged SAR) may be utilized by a user of the wireless device to track the current SAR in real-time. The wireless device may further utilize the determination of aggregate SAR's to ensure that the prescribed SAR limits are not exceeded by adjusting the average transmitter power levels of the wireless device over any specified time window for the current exposure scenario. For example, if the aggregate SAR is higher than allowed by the applicable standards or regulations, then the power levels from the active transmitters may be decreased. Conversely, if the aggregate SAR is lower than allowed, then the power levels from the active transmitters may be increased as needed.

Figure 5:
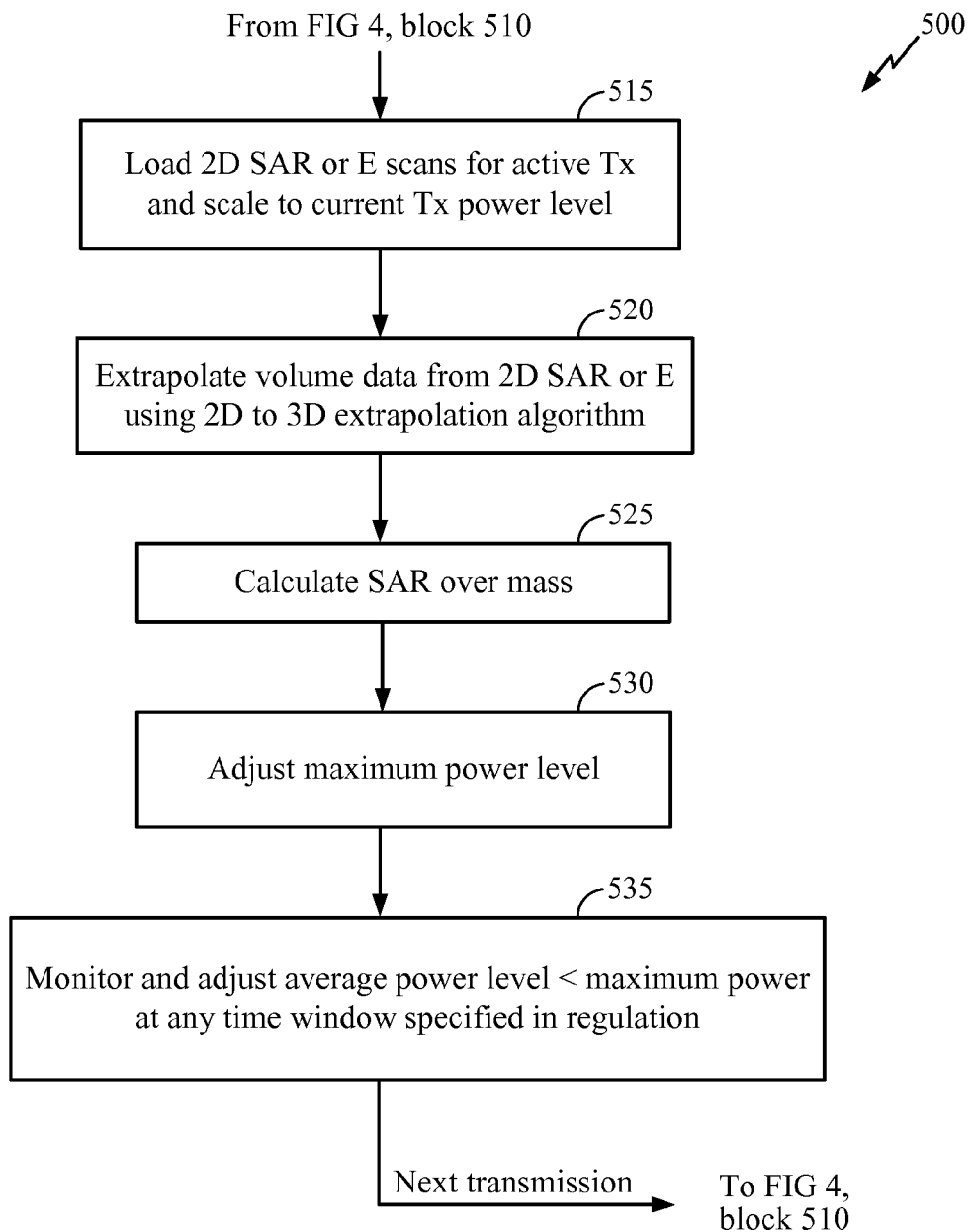
FIGS. 5 and 5A illustrate an exemplary embodiment of real-time operations performed according to the present disclosure.
Figure 5A:
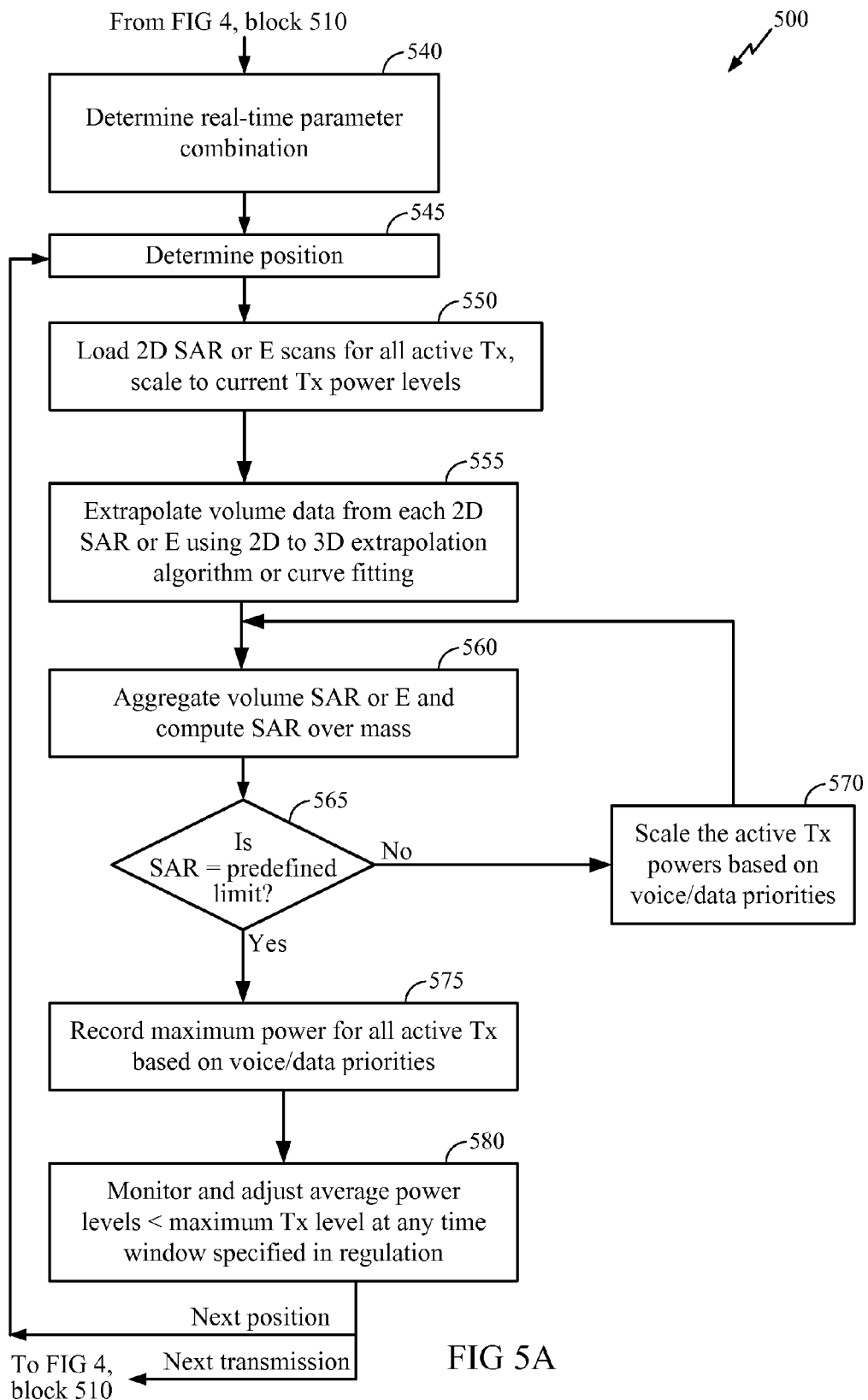

Method 500, further illustrated in block 510 of FIG. 4 and FIGS. 5, 5A, further describes in detail an exemplary embodiment of operations performed during real-time operation of the wireless device according to the present disclosure. It will be appreciated that the real-time operations described with reference to method 500 are given for illustrative purposes only, and are not meant to limit the scope of the present disclosure to any particular operation or sequence of operations to be performed in real-time by a wireless device. In alternative exemplary embodiments, one of ordinary skill in the art may omit certain operations from those shown, or add certain auxiliary operations not explicitly described, without departing from the scope of the present disclosure. Such alternative exemplary embodiments are contemplated to be within the scope of the present disclosure.

In alternative exemplary embodiments, it will be appreciated that the method 500, including blocks 510-580, may be practiced independently of the method 400, including blocks 410-440 in FIG. 4. For example, in an alternative exemplary embodiment (not shown), the SAR or E-field data corresponding to the basis surface scans may alternatively be derived from computer electromagnetic simulation or a mixture of simulation and measurement, rather than exclusively from measurement using a test set-up 100 such as described with reference to method 400 of FIG. 4. Such alternative exemplary embodiments are contemplated to be within the scope of the present disclosure.

At block 510, during real-time operation of the wireless device, it is determined whether the wireless device is currently (i.e., in real-time) transmitting simultaneously using multiple transmitters or antennas. If no (e.g., only one transmitter or antenna is active), the method proceeds to block 515 of FIG. 5. If yes (e.g., multiple transmitters or antennas are simultaneously active), the method proceeds to block 540 of FIG. 5A.

FIG. 5 illustrates real-time operations performed by the method 500 when it is determined that multiple transmitters or antennas are not simultaneously active, e.g., only one transmitter and one antenna are active.

In particular, at block 515, if there is no simultaneous transmission during real-time operation, the wireless device will determine the parameter combination for the current active transmitter, as well as the current active transmitter's power level. It will be appreciated that the wireless device will generally have access to real-time information about, e.g., the specific band(s), transmitter(s), channel, antenna(s) and technology, as such information may be available from one or more components of the device, e.g., the transmitter modem and/or embedded co-existence manager of the device. The stored basis surface scan (electric fields or point SAR data) corresponding to this parameter combination is retrieved from memory. At block 520, 2D-to-3D extrapolation is performed, to determine the mass-averaged SAR (e.g., over a mass of 1 g or 10 g) distribution in the volume projected by the surface scan into the body phantom 150.

At block 525, the peak mass-averaged SAR (e.g., 1 g or 10 g) is calculated from the extrapolated 3D volume mass-averaged SAR determined in block 520.

At block 530, the current transmitter power level is adjusted to determine the maximum transmitter power level so that the peak mass-averaged SAR value determined in block 525 meets the SAR limits. It will be appreciated that such adjustment may include either decreasing or increasing the TX power level.

At block 535, the average transmitting power level of the active transmitter is continuously monitored. In an exemplary embodiment, this transmitter power level may be increased or decreased such that the average power level meets the mass-averaged SAR limits over any time window specified in the regulation.

FIG. 5A illustrates real-time operations performed by the method 500 when it is determined at block 510 that multiple transmitters are simultaneously active.

In FIG. 5A, at block 540, the parameter combination for the real-time operating scenario, i.e., the real-time parameter combination, is determined. For example, the real-time parameter combination specifies the real-time band(s), channel(s), transmitter(s), antenna(s), technology, etc., as well as the per-transmitter power levels, and may be input to a processor of the wireless device implementing the algorithm described herein. In an exemplary embodiment, the real-time transmit power levels of the device may be directed by a network, e.g., according to a power control scheme defined in industry standards, etc. It will be appreciated that the wireless device will generally have access to real-time information about the real-time operating parameters, as such information may be available from, e.g., the transmitter modem and/or embedded co-existence manager of the device.

At block 545, the wireless device position relative to the body is determined. For example, such information may be obtained from one or more body position sensors of the wireless device.

At block 550, the stored basis surface scans (e.g., SAR or E-field data) corresponding to the real-time parameter combination are retrieved from memory, and scaled according to their Tx power levels. In particular, as earlier described hereinabove, an arbitrary real-time parameter combination may generally be decomposed into a collection of one or more basis parameter combinations.

Once the one or more basis parameter combinations for the real-time parameter combination are determined, the components of the corresponding one or more basis surface scans are retrieved from memory. In particular, such components may include, e.g., magnitude and phase components of the E-field, or point SAR. Further at block 550, the components of each loaded basis surface scan are scaled according to the real-time transmitter power level corresponding to that basis parameter combination. For example, assume that transmitters #1 and #2 of a five-transmitter system are enabled for the given combination, with transmitter #1 transmitting at power level P1 and transmitter #2 transmitting at power level P2. Then, at block 550, the basis surface scans for transmitters #1 and #2 are loaded for further processing. Furthermore, the basis surface scan for transmitter #1 is scaled by P1, while the basis surface scan for transmitter #2 may be scaled by P2.

Note in the preceding example, each transmitter is assumed to be directly coupled to a single antenna, and the antenna corresponding to each transmitter is therefore not additionally specified in this example, purely for ease of discussion. However, one of ordinary skill in the art will appreciate that the scope of the present disclosure covers real-time parameter combinations in which transmitter(s) are arbitrarily coupled to antenna(s), and therefore different transmitter-antenna couplings will generally necessitate the loading and scaling of different basis surface scans.

At block 555, volume data (also denoted herein as "volume SAR") is extrapolated from each loaded basis surface scan. In particular, as earlier described hereinabove, each basis or sub-group surface scan forms the basis of a 2D-to-3D extrapolation of 2D SAR data to a 3D volume projected by the 2D surface scan area into the body phantom 150. In an exemplary embodiment, the size of the volume may be large enough to encapsulate the peak SAR locations from all active transmitters/antennas in the wireless device 140. The extrapolation may be performed using 2D-to-3D extrapolation algorithms, e.g., such as disclosed in Kanda et al., earlier referenced hereinabove. Other curve-fitting techniques known in the art may also be applied, and such alternative exemplary embodiments are contemplated to be within the scope of the present disclosure.

At block 560, the basis or (sub-group) volume SAR's as determined at block 555 are aggregated, e.g., summed, over the entire volume projected by the surface scan into the body phantom. Further at block 560, the peak mass-averaged (e.g., 1 g or 10 g) SAR is computed from the aggregated volume SAR's.

At block 565, it is checked whether the SAR determined at block 560 is equal to a predefined limit. For example, in the case of 1 g SAR, the regulatory limit corresponds to 1.6 W/kg, and in the case of 10 g SAR, 2.0 W/kg. In an exemplary embodiment, the SAR used for this comparison may correspond to the peak (spatial) mass-averaged SAR, as averaged in time over a specific time window. If the peak mass-averaged SAR is not equal to the predetermined level, then the method proceeds to block 570, wherein the TX power levels for each active transmitter can be iteratively adjusted via blocks 560, 565, 570, e.g., based on voice and/or data priorities.

For example, if three transmitters, e.g., TX #1, TX #2 and TX #3, are active in the current operating scenario, priority levels may assigned to each of these transmitters by the wireless device based on whether the transmitter is currently supporting voice or data transmission, e.g., as defined in the product specification. If the predefined limit for the aggregate mass-averaged SAR is not exceeded at the current power levels, then the power of the transmitter with the highest priority may be increased as needed until the SAR reaches its maximum allowed level. Subsequently, the power of the transmitter with the next highest priority may be increased, etc., until the condition at block 565 is satisfied. Similarly, the TX power levels may be decreased according to priority levels if the SAR exceeds the limit. In an exemplary embodiment, each parameter combination may have a distinct assignment of voice and data to transmitters.

Note the iterative process described with reference to blocks 560-570 is provided for illustrative purposes only, and is not meant to limit the scope of the present disclosure. One of ordinary skill in the art may readily derive alternative exemplary embodiments for adjusting the per-transmitter power levels to comply with the SAR requirements. Note once the condition at block 565 is satisfied, then the method proceeds to block 575.

At block 575, the maximum allowable power is recorded for all active transmitters based on voice/data priorities for the current operating scenario.

At block 580, average transmitting power levels of all the active transmitters are continuously monitored to ensure that they are less than the maximum allowable power levels determined and recorded at block 575. In an exemplary embodiment, once the maximum power levels are determined at block 575, then for the current operating scenario they need not be continuously computed during real-time operation of the device. Note however that the real-time power levels may be continuously monitored to ensure the average power over any specified time window remains less than the maximum power levels.

In particular, note that some regulatory bodies provide a time-averaged window, e.g., 6 minutes, for SAR, effectively mandating that the SAR of a device when averaged over any 6-minute time window should be less than the prescribed limit. In general, the SAR can exceed the time-averaged limits for brief periods of time, as long as the time-averaged SAR is less than the limit. Note that the 6-minute time window is mentioned herein for illustrative purposes only, and is not meant to limit the scope of the present disclosure.

In an exemplary embodiment, the per-transmitter power levels may be adjusted to be less than the maximum per-transmitter power limit over any time window specified in the regulations for peak mass-averaged SAR. Note if there is only a change in position of the wireless device relative to the body, then the real-time method may be repeated from block 545. On the other hand, if there is a change in the operating condition (e.g., transmitter(s)/antenna or band(s) or technology of channel(s)), then the method may be repeated from block 510.

By providing real-time construction or estimation of SAR from the stored basis surface scan and real-time parameter combination, it will be appreciated that the number of SAR measurements that need to be performed on a device 120 according to method 400 will be significantly reduced as compared to method 300. For example, for a 10-band, 4-transmitter device (i.e., M=10, N=4) accommodating 3 channels, 3 technologies, and 5 positions earlier described hereinabove, the total number of SAR surface scan measurements would be 10×4×3×3×5=1800, corresponding to a 366× factor reduction in the number of measurements required (assuming for ease of illustration that all combinations of M, N, T, C, and P are supported by the wireless device). Furthermore, the cost savings would also include the time reduction afforded by performing only surface scans, as opposed to surface scan plus volume scan for each parameter combination.

While exemplary embodiments have been described herein with reference to techniques for ensuring compliance with RF exposure regulations, one of ordinary skill in the art will appreciate that the present techniques may also be utilized in applications for ensuring compliance with, e.g., hearing aid compatibility (HAC) exposure regulations. Such alternative exemplary embodiments are contemplated to be within the scope of the present disclosure.

Figure 6:
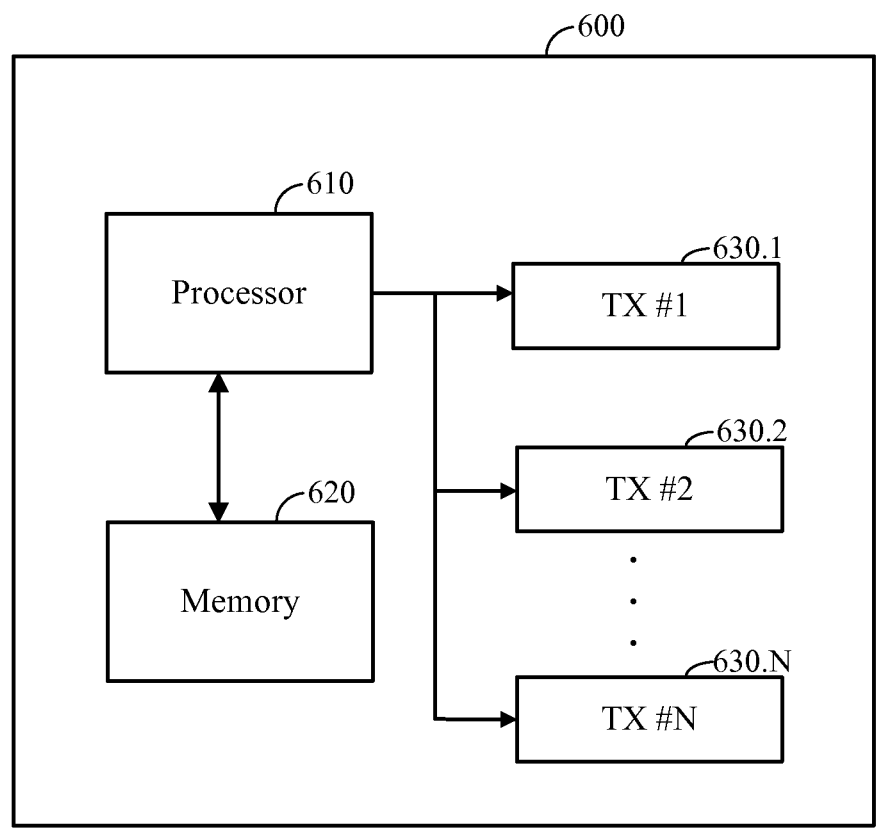
FIG. 6 illustrates an exemplary embodiment of a wireless device for implementing the techniques of the present disclosure.

FIG. 6 illustrates an exemplary embodiment of a device for implementing the techniques of the present disclosure. Note FIG. 6 is shown for illustrative purposes only, and is not meant to limit the scope of the present disclosure.

In FIG. 6, a device 600 includes a processor 610, a memory 620, and transmitters 630.1 through 630.N. The memory 620 may store basis surface scans as determined, e.g., according to the baseline measurement blocks 410-440 described with reference to FIG. 4. Alternatively, the basis surface scans stored in memory 620 may be derived from electromagnetic simulations, or a combination of simulation and measurement.

During real-time operation, the processor 610 may load the basis surface scan or scans corresponding to the real-time parameter combination from the memory 620. The processor 610 may estimate the SAR based on knowledge of the position and real-time parameter combination, e.g., as described with reference to FIGS. 5 and 5A. Based on the estimated SAR, the processor 610 may further adjust the power levels of the transmitters 630.1 through 630.N to ensure RF exposure compliance of the device 600, according to the principles of the present disclosure.

In light of the present disclosure, it will be appreciated that an algorithm implementing the methods described may be embedded into the processor 610 to assess and ensure compliance of a wireless device with RF exposure requirements in real time. In particular, compliance of a wireless device with regulatory requirements is advantageously evaluated and ensured in real-time, in contrast with prior art approaches which require demonstrating compliance using prior testing of the wireless device across a large number of possible operating parameter combinations, e.g., combinations specifying active transmitter(s)/antenna(s), frequency band(s), channel(s), technologies, and position(s) relative to a body.

In an exemplary embodiment, the device 600 may be a wireless device, and the processor and memory storing instructions for causing the processor to execute the algorithm described herein may be integrated in, e.g., a baseband modem integrated circuit (IC) of the wireless device, while the transmitters may be separately provided on a radio-frequency (RF) IC. In an alternative exemplary embodiment, the device 600 may be provided separately from the wireless device whose exposure compliance is to be determined, e.g., the processor 610 and memory 620 may be provided in a computer configured to determine exposure compliance of one or more wireless devices of interest. Such alternative exemplary embodiments are contemplated to be within the scope of the present disclosure.

Figure 7:
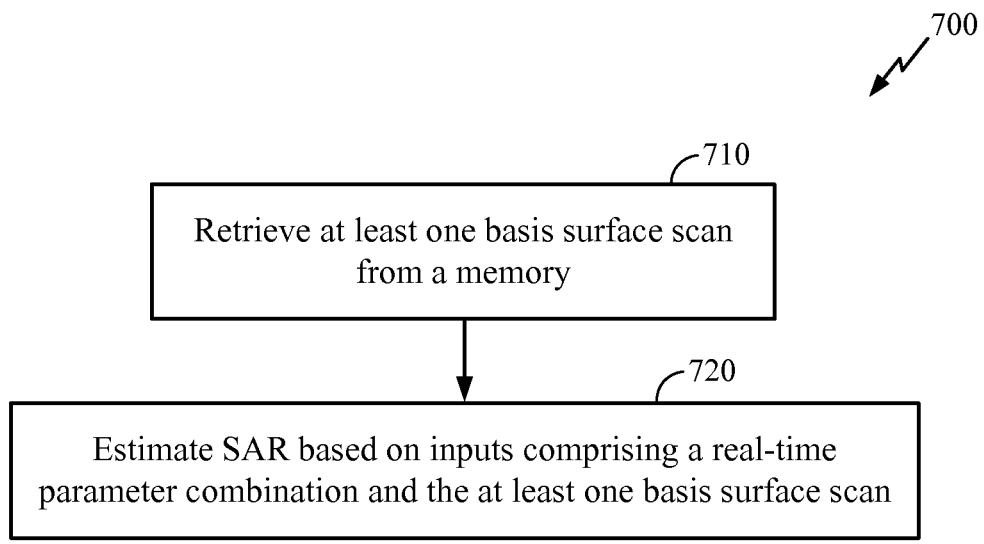
FIG. 7 illustrates an alternative exemplary embodiment of a method according to the present disclosure.

FIG. 7 illustrates an alternative exemplary embodiment of a method 700 according to the present disclosure. In FIG. 7, at block 710, at least one basis surface scan is retrieved from a memory. Each basis surface scan may correspond to a two-dimensional SAR or E-field scan of a wireless device given a specific operating scenario wherein only one transmitter and one antenna are enabled. At block 720, SAR is estimated based on inputs comprising the real-time parameter combination and the at least one basis surface scan.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, electric fields, SAR, magnetic fields or particles, optical fields or particles, or any combination thereof.

Those of skill in the art would further appreciate that the various illustrative logical blocks, modules, circuits, and algorithm steps described in connection with the exemplary aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary aspects of the invention.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary aspects disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable media.

The previous description of the disclosed exemplary aspects is provided to enable any person skilled in the art to make or use the invention. Various modifications to these exemplary aspects will be readily apparent to those skilled in the art, and the generic principles defined herein may be applied to other exemplary aspects without departing from the spirit or scope of the invention. Thus, the present disclosure is not intended to be limited to the exemplary aspects shown herein but is to be accorded the widest scope consistent with the principles and novel features disclosed herein.

The invention claimed is:

1. An apparatus comprising:
 a memory storing a plurality of basis surface scans representing surface scans for only a subset of possible combinations of parameters used for transmission; and
 a processor configured to estimate SAR in real time by:
  retrieving from memory a basis surface scan, from among the surface scans for only a subset of possible combinations of parameters used for transmission, corresponding to each active transmitter and antenna combination of the real-time parameter combination;
  extrapolating each retrieved basis surface scan to a predefined volume;
  aggregating all extrapolated volume scans; and
  calculating the peak SAR over a mass based on the aggregated scans to estimate peak mass-averaged SAR.

2. The apparatus of claim 1, each basis surface scan specifying the values of a parameter over a two-dimensional surface.

3. The apparatus of claim 2, the parameter corresponding to a complex vector electric field component.

4. The apparatus of claim 3, each complex vector electric field component comprising three scalar components corresponding to three axes orthogonal in space.

5. The apparatus of claim 4, each scalar component comprising a magnitude and a phase.

6. The apparatus of claim 2, the parameter corresponding to specific absorption rate (SAR).

7. The apparatus of claim 1, the apparatus comprising a wireless device.

8. The apparatus of claim 7, the wireless device comprising a cellular phone.

9. The apparatus of claim 1, further comprising a plurality of transmitters corresponding to the stored basis surface scans.

10. The apparatus of claim 1, the processor further configured to adjust the power levels of a plurality of transmitters corresponding to the stored basis surface scans to drive the estimated SAR to a predetermined level.

11. A method comprising:
retrieving at least one basis surface scan from a memory representing surface scans for only a subset of possible combinations of parameters used for transmission; and
estimating SAR in real time by:
retrieving from memory a basis surface scan, from among the surface scans for only a subset of possible combinations of parameters used for transmission, corresponding to each active transmitter and antenna combination of a real-time parameter combination;
extrapolating each retrieved basis surface scan to a predefined volume;
aggregating all extrapolated volume scans; and
calculating the peak SAR over a mass based on the aggregated scans to estimate peak mass-averaged SAR.

12. The method of claim 11, the method further comprising:
assessing whether the wireless device complies with radio-frequency (RF) exposure requirements during real-time operation of the device.

13. The method of claim 11, the real-time parameter combination specifying at least one parameter of a group comprising a frequency band, at least one active transmitter, antenna, channel, technology, and a position relative to a body.

14. The method of claim 11, the method further comprising dynamically adjusting the power level of at least one transmitter of the wireless device to ensure that the estimated SAR complies with a predetermined requirement.

15. The method of claim 11, each basis surface scan comprising components determined from measurements of SAR or E-field.

16. The method of claim 11, each basis surface scan comprising components determined from electromagnetic simulations performed to determine SAR or E-field.

17. An apparatus comprising:
means for retrieving a plurality of basis surface scans from a memory of a wireless device, the plurality of basis surface scans representing surface scans for only a subset of possible combinations of parameters used for transmission; and
means for estimating SAR in real time by:
retrieving from memory a basis surface scan, from among the surface scans for only a subset of possible combinations of parameters used for transmission, corresponding to each active transmitter and antenna combination of the real-time parameter combination;
extrapolating each retrieved basis surface scan to a predefined volume;
aggregating all extrapolated volume scans; and
calculating the peak SAR over a mass based on the aggregated scans to estimate peak mass-averaged SAR.

18. The apparatus of claim 17, further comprising:
means for assessing whether the wireless device complies with radio-frequency (RF) exposure requirements during real-time operation of the wireless device.

19. The apparatus of claim 17, each basis surface scan specifying the values of a parameter over a two-dimensional surface.

20. The apparatus of claim 19, the wireless device comprising a cellular phone.

* * * * *